W. C. CLOW.
ANIMAL TRAP.
APPLICATION FILED JUNE 16, 1913.
1,116,565.
Patented Nov. 10, 1914.
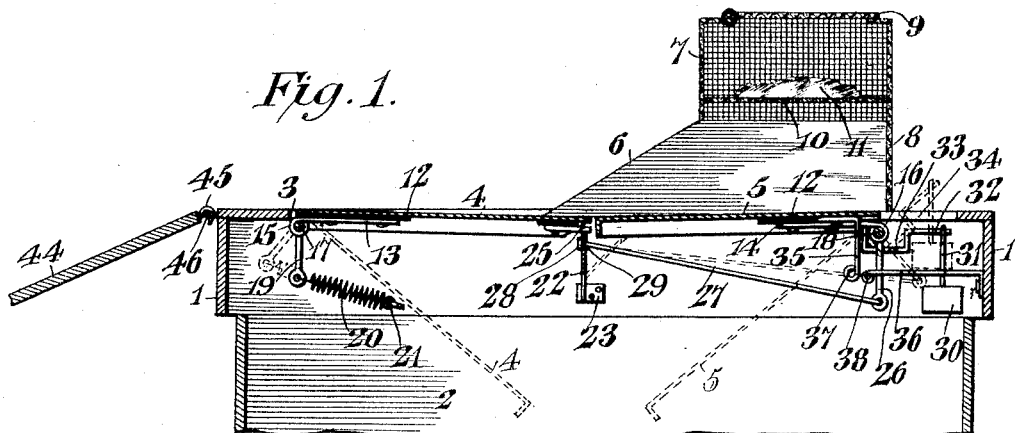
Fig. 1.
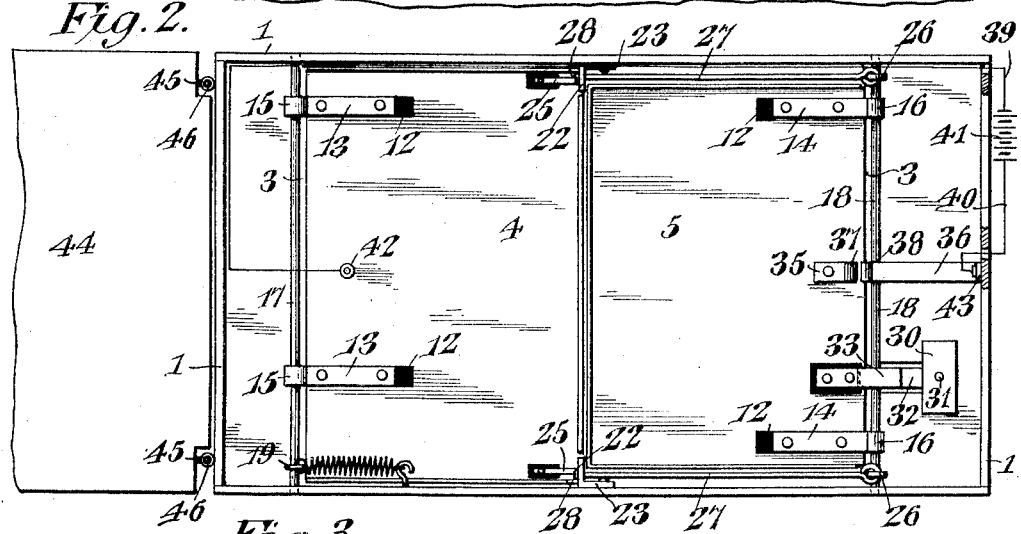
Fig. 2.
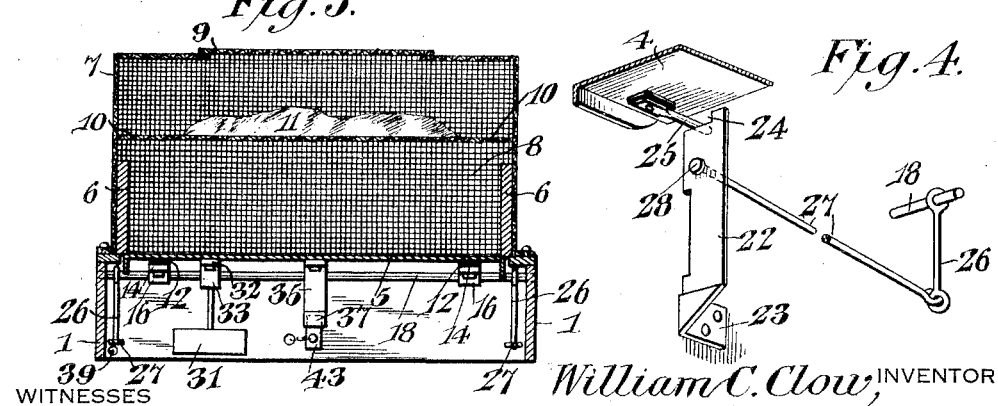
Fig. 3.
Fig. 4.
William C. Clow, INVENTOR
WITNESSES
BY
ATTORNEY

UNITED STATES PATENT OFFICE.

WILLIAM COOPER CLOW, OF PORTLAND, OREGON, ASSIGNOR OF ONE-HALF TO CALLEST S. DUNNING, OF PORTLAND, OREGON.

ANIMAL-TRAP.

1,116,565. Specification of Letters Patent. Patented Nov. 10, 1914.

Application filed June 16, 1913. Serial No. 774,032.

*To all whom it may concern:*

Be it known that I, WILLIAM C. CLOW, a citizen of the United States, residing at Portland, in the county of Multnomah and State of Oregon, have invented a new and useful Animal-Trap, of which the following is a specification.

The invention relates to improvements in animal traps.

The object of the present invention is to improve the construction of animal traps, and to provide a simple, inexpensive and efficient animal trap, designed particularly for capturing or destroying rodents, and equipped with means for electrocuting the captured animals when desired, so that the latter may be readily removed from the trap without danger or inconvenience.

A further object of the invention is to provide a trap of this character having an open structure and in which the captured animals will be concealed from view, so that animals will freely approach the trap and not be deterred from entering the same either by the construction thereof or the sight of the captured animals.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical longitudinal sectional view of an animal trap, constructed in accordance with this invention. Fig. 2 is a reverse plan view of the same. Fig. 3 is a transverse sectional view. Fig. 4 is a detail perspective view of one of the locking springs for supporting the front trap door in a substantially rigid position until the animal depresses the rear trap door and releases the front one.

Like numerals of reference designate corresponding parts in all the figures of the drawing.

In the accompanying drawing in which is illustrated the preferred embodiment of the invention, 1 designates a substantially rectangular casing, designed to be constructed of wood or any other suitable material and composed of side walls, end walls and a connecting top. The casing, which is open at the bottom, is designed to be arranged over a suitable receptacle 2 for containing the captured animals, and the top of the casing is provided with a rectangular opening 3 in which are mounted front and rear trap doors 4 and 5, preferably inclined downwardly and inwardly toward each other, as clearly illustrated in Fig. 1 of the drawing. The casing is also provided at its rear portion with upwardly extending side supports 6, having tapered front portions and provided with horizontal upper edges and receiving and supporting a superimposed bait receptacle 7, designed to contain a suitable bait for attracting the animals to be captured or destroyed. The side supports 6 are located at opposite sides of the rear trap door 5, and they prevent the animal from springing laterally and escaping from the casing when it begins to depress the rear trap door. The bait receptacle, which is oblong, is rectangular in cross section and it extends across the space between the support 6 and is preferably constructed of wire gauze, provided at its rear wall with a wire extension 8, closing the space at the rear ends of the side supports 6. The bait receptacle, which is provided at the top with a suitable door 9, has a horizontal bottom 10, located above the lower edges of the front and side walls and adapted to support the bait 11 at an elevation out of reach of the animals, and as it is impossible for the animals to obtain the bait, the latter may be used for a comparatively long time without replenishing it.

The trap doors 4 and 5, which are constructed of suitable metal, are preferably provided at their inner edges and at their side edges with depending flanges, and are hinged at their outer transverse edges and are insulated from the hinges by strips 12 of suitable insulation extending along and interposed betwen leaves or hinge elements 13 and 14, provided with eyes 15 and 16 in which are rigidly secured pintle rods 17 and 18, journaled at their terminals in suitable bearings in the side walls of the casing and hinging the trap doors within the same, whereby the trap doors are adapted to swing downwardly and inwardly to precipitate an animal into the receptacle 2. The trap doors may be hinged in any other desired manner, and the front trap door 4 is provided at one side with a depending arm 19 to which is connected one end of a coiled spring 20, suitably secured at its other end to an adjacent side wall of the casing at the interior thereof preferably by engaging a hook 21. The spring yieldably maintains the front trap door 4 in its closed position, and when the front trap door is released from the locking means hereinafter described, it is adapted to swing downwardly under the weight of an animal, and when relieved of such weight it will be automatically returned to such position by the action of the spring 20.

In order to prevent the front trap door 4 from yielding when first subjected to the weight of an animal and before the latter has reached the rear trap door 5, the said front trap door 4 is rigidly supported in its position by opposite locking springs 22, arranged in a vertical position at the inner faces of the side walls of the casing and constructed of suitable resilient material and provided at their lower ends with attaching flanges or portions 23, secured to the side walls of the casing. The attaching flanges 23 may be formed integral with the springs 22 by bending the lower ends of the springs diagonally and then bending the transverse portions at right angles, as clearly illustrated in Fig. 4 of the drawing. The springs, which may be mounted in any other desired manner, are provided in their upper ends with recesses 24, arranged to receive studs 25 secured to and projecting from the inner transverse edge to the front trap door 4. When the front trap door swings upwardly to its closed position, the studs are adapted to flex the upper portions of the locking springs, which automatically engage the studs as soon as the latter pass the bottom edges of the recesses 24.

The front trap door 4 is maintained in its closed position until the animal steps upon the rear trap door 5, which swings downwardly and oscillates a pair of depending arms 26, rigid with the pintle rod 18 and provided at their lower ends with eyes into which are linked eyes of connecting rods 27, extending forwardly from the depending arms 26 to the supporting and locking springs 22 and piercing the upper portions thereof. The front ends of the connecting rods 27 are provided with heads 28 of greater diameter than the perforations 29 through which the connecting rods pass, and when the depending arms 26 of the rear trap door 5 are swung rearwardly, they carry with them the supporting and locking springs 22 and move the upper ends of the same out of engagement with the projecting studs 25, thereby releasing the front trap doors and causing the animal to be suddenly precipitated into the receptacle 2. The trap doors immediately close and effectually prevent the escape of an animal from the receptacle 2, when the trap is used without the electrical means hereinafter described for electrocuting the captured animals.

The rear trap door is normally maintained in its closed position by a weight 30, provided with a rod or stem 31, which is pivotally or loosely connected with an arm 32, extending rearwardly from the rear trap door 5 and provided with a depending approximately U-shaped bend 33 to enable it to clear the pintle rod 18. When the trap door 5 is depressed, the arm 32 swings upwardly and forwardly and approaches the vertical plane of the pivotal point, thereby reducing or lessening the effect of the weight on the platform 5. This construction and arrangement operates to accelerate the opening movement of the rear trap door when the same is subjected to the weight of an animal. The weight automatically closes the rear trap door 5 when the latter is relieved of the pressure of the animal. The top of the casing is provided with a slot 34, located in rear of the depending portion 8 of the rear wall of the bait receptacle and at a point above the arm 32 to permit the latter to swing upwardly, as illustrated in dotted lines in Fig. 1 of the drawing. When the rear trap door swings downwardly, it carries a movable contact arm 35 into contact with a relatively fixed contact arm 36, thereby closing an electric circuit and subjecting the animal to the action of the current thereof. The contact arm 35, which depends from the rear door 5 at the rear portion thereof, is constructed of suitable resilient material and is arranged in substantially a vertical plane when the door 5 is closed. The other contact arm 36 is also constructed of resilient material and is arranged in substantially a horizontal position in rear of and in the path of the arm 35, and the adjacent terminals 37 and 38 of the arms 35 and 36 are rolled to enable the arm 35 to readily depress and slide over the arm 36. The arms 35 and 36 are normally out of contact with each other, and the trap doors are spaced and insulated from each other so that there is a double break in the electric circuit, it being necessary in order to complete the circuit for the animal to stand on both of the trap doors and to depress the rear trap door 5 and carry the arms 35 and 36 into contact with each other. This arrangement prevents the animal from being shocked by the current until it is in a position where it is impossible for it to escape and where it must necessarily be precipitated into the receptacle 2. The wires 39 and 40 of the electric circuit extend from a battery 41 or other suitable source of electrical energy and are connected, respectively, with the front trap door 4 and with the contact arm 36. The wire 39 enters the casing 1 at the back thereof and extends along one side and partially across the front wall of the casing where it has a slack portion connected with a binding post 42 at the lower face of the front trap door 4. The other wire 40 also enters the trap at the back thereof and is suitably connected to an attaching portion 43 of the horizontal contact arm 36. The current is designed to be of sufficient strength to kill the captured animals, but the trap may be used either with or without the means for electrocuting the animals.

In order to enable the animals to reach the top of the casing, an incline or gangway 44 is detachably connected by hooks 45 and eyes 46 with the front end of the casing. The inclined approach 44 may be of any preferred construction and is adapted to be readily connected to and detached from the trap.

What is claimed is:—

1. A trap of the class described including a casing, front and rear trap doors hinged at their outer ends, the inner ends of the trap doors being arranged adjacent to each other and adapted to swing downwardly in the opening movement of the doors, means for yieldably maintaining the trap doors normally in their closed position, a movable device mounted upon the casing and arranged beneath the front trap door for supporting the same in its closed position, and means for connecting the said device with the rear trap door, whereby when the latter is depressed the said device will be moved beyond the front trap door to release the same.

2. A trap of the class described including a casing, front and rear trap doors hinged at their outer ends, the inner ends of the trap doors being arranged adjacent to each other and adapted to swing downwardly in the opening movement of the doors, means for yieldably maintaining the trap doors normally in their closed position, a locking and supporting spring mounted on the casing and located beneath the front trap door and arranged to normally support the same in its closed position, and means for connecting the said spring with the rear trap door, whereby when the latter is depressed the spring will be withdrawn from the front trap door.

3. A trap of the class described including a casing, front and rear trap doors hinged at their outer ends, the inner ends of the trap doors being arranged adjacent to each other and adapted to swing downwardly in the opening movement of the doors, means for yieldably maintaining the trap doors normally in their closed position, substantially upright springs arranged beneath the front trap door for supporting the latter in its closed position, arms depending from and actuated by the rear trap door, and rods connecting the arms with the springs, whereby when the rear trap door is depressed the springs will be withdrawn from beneath the front trap door to release the same.

4. A trap of the class described including a casing, front and rear trap doors hinged at their outer edges and having their inner edges arranged adjacent to each other, the front trap door being provided with a projecting stud, a substantially upright spring secured at its lower end and provided at its upper end with a recess receiving the said stud for normally supporting the front trap door in its closed position, and connections between the spring and the rear trap door for withdrawing the spring to release the front trap door when the rear trap door is depressed.

5. A trap of the class described, including a casing, a trap door hinged to the casing and having an arm projecting outwardly beyond the point of hinging, and a weight pivotally suspended from the arm and arranged to swing inwardly toward the vertical plane of the hinge point of the trap door in the opening movement thereof, whereby the effect of the weight decreases as the door opens to accelerate the opening movement.

6. A trap of the class described, including a casing, a depressible trap door having a pintle rod mounted in the casing, the latter being provided adjacent to the pintle rod with a slot, an arm carried by the trap door and having a loop extending vertically around the pintle rod, the outer portion of the arm being arranged to swing upwardly through the slot, and a weight contained within the casing and connected with the arm and arranged to be carried toward the vertical plane of the pintle rod by the opening movement of the trap door, whereby the effect of the weight decreases with the opening movement of the trap door to accelerate such movement.

In testimony, that I claim the foregoing as my own, I have hereto affixed my signature in the presence of two witnesses.

WILLIAM COOPER CLOW.

Witnesses:
 Geo. L. Dilto,
 Otto Starker.